United States Patent [19]
Stevens

[11] Patent Number: 6,018,339
[45] Date of Patent: Jan. 25, 2000

[54] AUTOMATIC VISUAL CORRECTION FOR COMPUTER SCREEN

[76] Inventor: Susan Stevens, P.O. Box 8439, Delair, N.J. 08110

[21] Appl. No.: 08/912,191

[22] Filed: Aug. 15, 1997

[51] Int. Cl.⁷ .................................................. G06F 13/00
[52] U.S. Cl. ........................ 345/334; 345/150; 345/326; 345/342; 351/200; 351/173
[58] Field of Search ........................... 345/150, 326–342; 351/173, 200

[56] References Cited

U.S. PATENT DOCUMENTS

| | | | |
|---|---|---|---|
| 4,529,268 | 7/1985 | Brown | 350/276 |
| 4,903,218 | 2/1990 | Longo et al. | 364/521 |
| 5,073,933 | 12/1991 | Rosenthal | 380/25 |
| 5,305,012 | 4/1994 | Faris | 345/7 |
| 5,325,136 | 6/1994 | Salibello et al. | 351/243 |
| 5,335,320 | 8/1994 | Iwata et al. | 395/155 |
| 5,369,332 | 11/1994 | Droscha | 313/478 |
| 5,381,191 | 1/1995 | Levy | 351/57 |
| 5,508,757 | 4/1996 | Chen | 348/818 |
| 5,515,118 | 5/1996 | Torrey et al. | 351/239 |
| 5,600,776 | 2/1997 | Johnson et al. | 395/326 |
| 5,818,446 | 10/1998 | Bertram et al. | 345/334 |

*Primary Examiner*—Richard A. Hjerpe
*Assistant Examiner*—Henry N. Tran
*Attorney, Agent, or Firm*—Norman E. Lehrer

[57] ABSTRACT

An automatic visual correction system allows different users to utilize different work stations and automatically adjusts the appearance of the indicia on the computer screen of the work station so as to make the same most comfortable for the particular user. This is accomplished by storing in memory various characteristics of the appearance of the indicia on the screen such as size, focus, contrast, brightness, color (of both the indicia and the screen) and other features for each user. Each user will have preselected each of these features and once the features are selected, the same will be stored along with information identifying the user. It may also be possible to store information relating to the user's eyeglass or contact lens prescription thereby allowing the computer to automatically make adjustments for such things as focus, size, astigmatisms and the like. In use, the user merely needs to identify himself, the computer will look up the adjustments that need to be made and the computer screen will automatically be adjusted for the particular user. Alternatively, the information for a particular user could be stored on a disk or other transportable media which could then be plugged into a computer work station when desired and the adjustments on the screen would be automatically made.

11 Claims, 1 Drawing Sheet

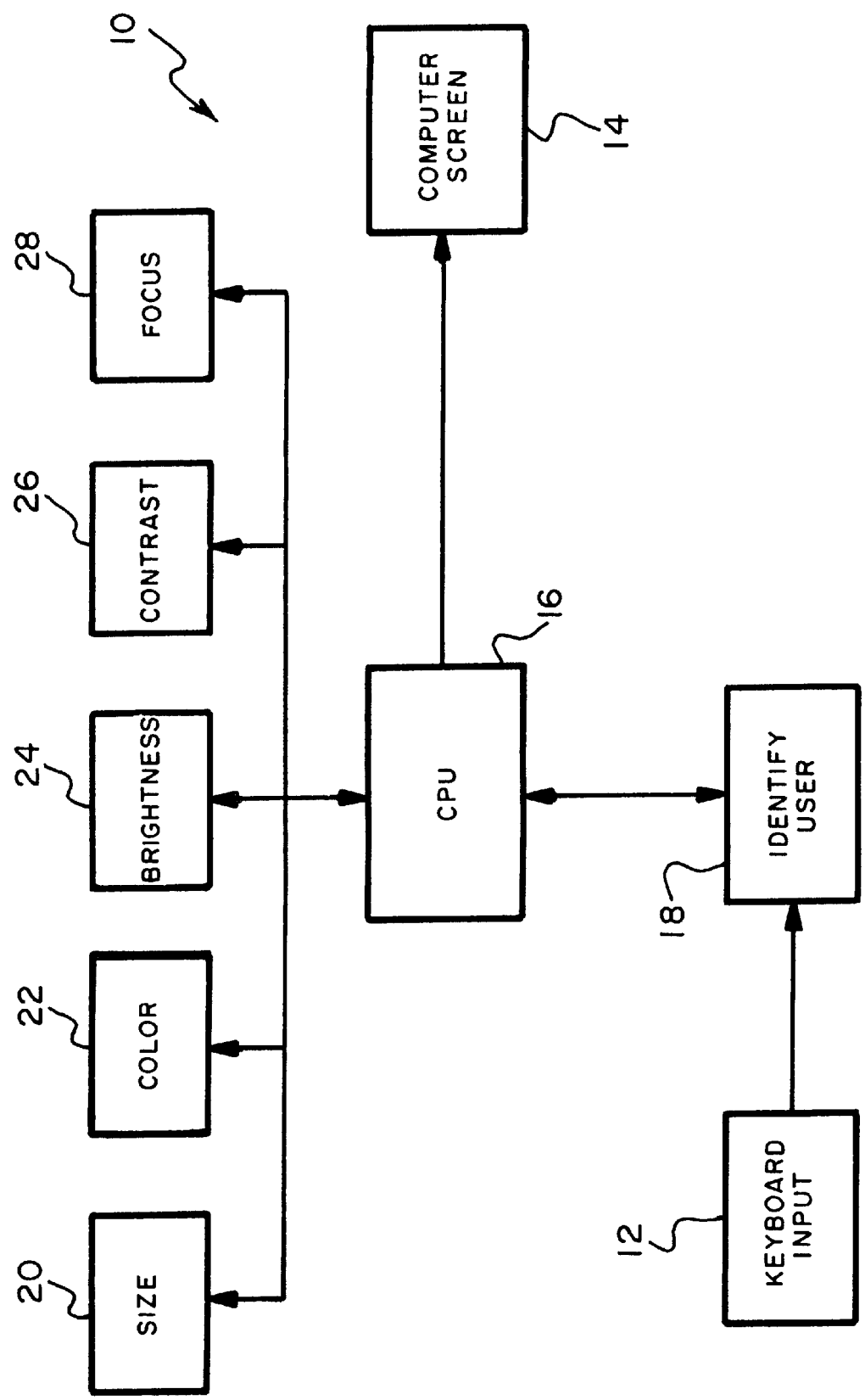

AUTOMATIC VISUAL CORRECTION FOR COMPUTER SCREEN

BACKGROUND OF THE INVENTION

The present invention is directed toward a computer work station and, more particularly, toward a computer work station that includes a means for automatically adjusting the visual appearance of the screen for different users.

Cathode ray tubes (CRT's) and other types of computer screens are in common use in the workplace and are now frequently used by all types of workers in a wide variety of industries. Furthermore, the use of computers and computer screens are increasing dramatically. Of course, as with any object being viewed, different people viewing a computer screen may see different things depending on their eyesight.

Many people utilizing a computer screen must wear corrective lenses just as they would when reading a book or viewing any other object. To avoid the use of corrective lenses, it has been proposed to provide a computer screen or other video display screen with an optical lens that fits over the entire face of the screen. One such example is shown in U.S. Pat. No. 4,529,268 to Brown. The lens described in this patent not only can be used to magnify the image on the screen but may also include color tinting or anti-glare features.

While the device shown in U.S. Pat. No. 4,529,268 may provide some assistance to the person viewing the video screen, it is believed that it has limited value since different lenses may be needed for different users. That is, different users of the work station or other system utilizing the computer screen may require more or less magnification or a different color tint in order to better view the images on the screen. Thus, if more than one user employs a single work station, that user may have to replace the lens of the patented system each time he or she wishes to utilize the work station.

As is also well known in the art, persons who utilize computer screens for long periods of time can experience eye strain and other problems relating thereto such as headaches, blurred vision, dry or irritated eyes, neck or back pains, etc. In order to ease this problem, many users adjust the screen by selecting different colors or hues of colors that are more comfortable to them. Some colors are more comfortable for some viewers while those same colors may be very irritating to others. Even further, the size of the indicia, the focus of the same and other features such as brightness and/or contrast have a significant effect on eye strain and the related problems.

Many computer screens have the ability to adjust some or all of the foregoing characteristics. A user frequently makes all of the adjustments such as selecting the color that is most comfortable to him or her before actually utilizing a work station. As long as that particular user continues to utilize that work station and no other users require use of the same, no serious problems are encountered since the adjustments can remain and the user will be comfortable. A problem can occur, however, when a different user desires to utilize that particular work station or when the particular user desires to utilize a different work station.

When different work stations must be used by different users, the user must either suffer the problems of possibly blurred vision and eye strain or must make all of the necessary adjustments prior to utilizing the same. This is, of course, very time consuming and the work stations will constantly be adjusted depending on the different users utilizing the same.

SUMMARY OF THE INVENTION

The present invention is designed to overcome the deficiencies of the prior art described above. The invention is directed toward a system that allows different users to utilize different work stations and which will automatically adjust the appearance of the indicia on the computer screen of the work stations so as to make the same most comfortable for the particular user. This is accomplished by storing in memory various characteristics of the appearance of the indicia on the screen such as size, focus, contrast, brightness, color (of both the indicia and the screen) and other features for each user. That user will have preselected each of these features and once the features are selected, the same will be stored along with information identifying the user. It may also be possible to store information relating to the user's eyeglass or contact lens prescription thereby allowing the computer to automatically make adjustments for such things as focus, size, astigmatisms and the like. Combinations of these are, of course, also possible. In any case, the user merely needs to identify himself or herself, the computer will look up the ajdustments that need to be made that are stored in that user's name and the computer screen will automatically be adjusted for the particular user. Alternatively, the information for a particular user could be stored on a disk or other transportable media which could then be plugged into a computer work station when desired and the adjustments on the screen would be automatically made. This would allow a user to move between work stations without having to spend long periods of time making adjustments.

BRIEF DESCRIPTION OF THE DRAWINGS

For the purpose of illustrating the invention, there is shown in the accompanying drawing one form which is presently preferred; it being understood that the invention is not intended to be limited to the precise arrangements and instrumentalities shown.

The sole FIGURE is a schematic representation of an automatic visual correction system for a computer screen according to the invention.

DETAILED DESCRIPTION OF THE PREFERRED EMBODIMENT

Referring now to the drawing in detail, there is shown in the sole FIGURE a schematic representation of an automatic computer screen adjusting system constructed in accordance with the principles of the present invention and designated generally as 10. The system 10 is built around a computer work station which includes an input means 12 which may be in the form of a keyboard, a mouse, a track ball or some other data input means or a combination thereof.

The computer work station included within the system 10 also includes a video display screen or computer screen 14 which may be a cathode ray tube (CRT) or a liquid crystal display or some other type of computer screen. In addition, the computer work station may include a central processing unit 16 which includes memory therein for storing information as more fully described below. Alternatively, the computer work station could be in the form of a "dumb terminal" connected to a centrally located processor and memory that services a number of remote dumb terminals. The invention is applicable to either system or to combinations thereof.

The computer work station also includes a means 18 for identifying a particular user logging on to or utilizing the system. The user identifier circuit or program 18 is, per se, well known in the art. As frequently occurs, when a user logs on to a system, the system frequently asks the user to identify himself or herself by name or code or the like. Only authorized users are then permitted onto the system. This information can be used with the present invention to then identify each of the users of the system.

Once a user has logged on to the system 10 and has identified himself, information concerning that user and identifying the particular user is stored in the processor 16. As the computer work station is being utilized, indicia which may be in the form of numbers, text, diagrams, charts or the like will be displayed on the computer video screen 14. The user can then make adjustments to the appearance of the indicia on the screen by various input and control circuits such as shown at 20, 22, 24, 26 and 28. These circuits can either be part of the computer program that is operating the system or can be separate dials or controls on the video screen or other parts of the computer hardware.

By way of example, box 20 diagrammatically illustrates that the size of the indicia on the screen 14 can be adjusted. As is well known in the art, this is frequently done utilizing the software within the system such as a word processing program or the like. Substantially all such programs include a way of selecting a different font or a larger size print. The user of the work station can select the font or print which is most comfortable to him or her and the information concerning the size of the print will then be stored in combination with the identification of the user.

Similarly, the color of the indicia on the computer screen 14 and/or the color of the background can be selected as schematically shown at 22. Again, this is normally done through the word processing program or other program being run by the work station and again these colors, which are most comfortable to the user, are stored and identified with the particular user.

While the brightness and contrast such as shown at 24 and 26 are frequently part of the CRT or video display itself, many systems also include means within the computer program for selecting these aspects of the appearance of the indicia on the screen 14. Thus, while separate controls might be possible to select the brightness and contrast and this information stored in the CPU 16, it may also be possible to select the brightness and contrast through the use of the keyboard 12 or other input device such as a mouse or the like.

Whether an image is in focus or out of focus, of course, may depend on the person viewing the same. An image may be in focus to one person because of his or her eyesight but out of focus to a second person. Thus, the system also has the capability of storing information relating to the focusing of the image. This is done through the block shown schematically at 28. Again, this may be done through the use of a computer program inputting information through the input 12 or from a separate control associated with the display. In either case, information concerning the focusing of the indicia on the computer screen 14 is then stored in the CPU and identified with the particular user.

As should be readily apparent to those skilled in the art, the particular aspects of the appearance of the indicia identified at items 20, 22, 24, 26 and 28 are by way of example only. Other criteria and aspects of the appearance of the indicia could also be selected. In any case, once the desired characteristics are selected for a particular user, the information is stored in the CPU and associated with the particular user. A second user would, of course, have a second set of settings associated with his or her name or identification.

In lieu of or in addition to selecting particular criteria such as size, focus or the like, it may also be possible to incorporate within a computer program certain criteria relating to a user's eyesight. That is, based on the user's prescription for his or her glasses or lenses, it may be possible to adjust the appearance of the indicia based on the prescription of a particular user. For example, if the computer were preset for user's having 20—20 vision, identifying a user as having 20–400 vision might cause the computer to automatically increase the size of the indicia by two or three times so that the particular user could then view the computer screen in substantially the same manner as a person who had 20—20 vision. Thus, each user's prescription could also be stored in the CPU and the computer could adjust the size or focus of the indicia on the computer screen based on that information either in addition to or in lieu of the other information previously set therein.

It is also within the scope of the present invention to store information concerning each individual user on a disk or other transportable means. In this way, if the user moves from one work station to another in an arrangement where the work stations are not interconnected and do not share a central processing unit, he or she need not recalibrate the work station but merely inserts the disk and the computer will automatically adjust the appearance of the indicia on the computer screen 14.

The present invention may be embodied in other specific forms without departing from the spirit or essential attributes thereof and accordingly reference should be made to the appended claims rather than to the foregoing specification as indicating the scope of the invention.

I claim:

1. In a computer work station having a keyboard, a computer including memory therein and a screen for displaying indicia thereon, the improvement comprising means for providing identification data for a user of said work station; means for modifying the appearance of said indicia on said screen in response to said identification data wherein said indicia on said screen will have a different appearance for each identified user; and means for storing said identification data relating to the conditions of the user's eyesight.

2. The invention as claimed in claim 1 further including means operable by said user for selecting and modifying different aspects of said appearance.

3. The invention as claimed in claim 2 further including means for storing information relating to said selected and modified aspects.

4. The invention as claimed in claim 3 wherein said means for storing includes means for storing information regarding a number of different users.

5. The invention as claimed in claim 4 wherein said means for storing includes means for associating sets of different stored information relating to said selected and modified aspects with different identified users.

6. The invention as claimed in claim 2 wherein said means for selecting and modifying different aspects of said appearance includes means for changing the focus of said indicia on said screen.

7. The invention as claimed in claim 2 wherein said means for selecting and modifying different aspects of said appearance includes means for changing the background color of said screen.

8. The invention as claimed in claim 2 wherein said means for selecting and modifying different aspects of said appearance includes means for changing the color of said indicia on said screen.

9. The invention as claimed in claim 2 wherein said means for selecting and modifying different aspects of said appearance includes means for changing the contrast of said screen.

10. The invention as claimed in claim 2 wherein said means for selecting and modifying different aspects of said appearance includes means for changing the brightness of said screen.

11. The invention as claimed in claim 2 wherein said means for selecting and modifying different aspects of said appearance includes means for changing the size of said indicia on said screen.

* * * * *